US008654909B2

(12) United States Patent  (10) Patent No.: US 8,654,909 B2
Ashida et al.  (45) Date of Patent:  Feb. 18, 2014

(54) SEMICONDUCTOR INTEGRATED CIRCUIT

(75) Inventors: Mitsuyuki Ashida, Yokohama (JP);
Hideaki Majima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 325 days.

(21) Appl. No.: 13/237,050

(22) Filed: Sep. 20, 2011

(65) Prior Publication Data

US 2012/0243583 A1    Sep. 27, 2012

(30) Foreign Application Priority Data

Mar. 25, 2011  (JP) .................................. 2011-67377

(51) Int. Cl.
*H03D 1/04*  (2006.01)
*H03D 1/06*  (2006.01)
*H03K 5/01*  (2006.01)
*H03K 6/04*  (2006.01)
*H04B 1/10*  (2006.01)
*H04L 1/00*  (2006.01)
*H04L 25/08*  (2006.01)

(52) U.S. Cl.
USPC ........... 375/346; 375/350; 375/284; 375/285; 375/229; 455/296; 455/307; 455/63.1

(58) Field of Classification Search
USPC .......... 375/346, 350, 284, 285, 229; 455/296, 455/307, 63.1
See application file for complete search history.

(56) References Cited

U.S. PATENT DOCUMENTS

| 6,999,742 | B2 | 2/2006 | Fang | |
| 7,512,392 | B2 * | 3/2009 | Millard et al. | 455/266 |
| 2002/0154614 | A1 * | 10/2002 | Jagger et al. | 370/332 |
| 2004/0229590 | A1 * | 11/2004 | Kubo et al. | 455/307 |
| 2008/0107217 | A1 * | 5/2008 | Vrcelj et al. | 375/350 |
| 2010/0220821 | A1 * | 9/2010 | Vrcelj et al. | 375/345 |
| 2012/0147929 | A1 * | 6/2012 | Malaga et al. | 375/147 |

FOREIGN PATENT DOCUMENTS

JP    2004-166228    6/2004

OTHER PUBLICATIONS

Wiser, et al. A 5-GHz Wireless LAN Transmitter with Integrated Tunable High-Q RF Filter, IEEE Journal of Solid-State Circuits, vol. 44, 2007.

Darabi. A Blocker Filtering Technique for Saw-Less Wireless Receivers, IEEE Journal of Solid-State Circuits, vol. 42, 2007.

* cited by examiner

*Primary Examiner* — Phuong Phu
(74) *Attorney, Agent, or Firm* — White & Case LLP

(57) ABSTRACT

According to an embodiment, a semiconductor integrated circuit includes an amplifier, an interference wave suppression unit, a coupler and a filter control circuit. The interference wave suppression unit includes a filter being controlled to be on or off. The filter is configured to suppress an interference wave component of an amplified signal to output the signal as an output signal when the filter is on. The coupler is configured to detect an input signal or the output signal. The filter control circuit controls the filter to be on when a signal level of a detection input signal or a detection output signal detected by the coupler is greater than or equal to a reference value, and controls the filter to be off when the signal level is smaller than the reference value, at arbitrary determination timing in a period of time between a transmission and a reception.

20 Claims, 13 Drawing Sheets

SEMICONDUCTOR INTEGRATED CIRCUIT

CROSS REFERENCE TO RELATED APPLICATION

This application is based upon and claims the benefit of priority from the prior Japanese Patent Application No. 2011-067377 filed on Mar. 25, 2011 in Japan, the entire contents of which are incorporated herein by reference.

FIELD

Embodiments described herein relate generally to a semiconductor integrated circuit.

BACKGROUND

In recent years, a transmission/reception system in a wireless communication system such as a mobile phone actively uses wider bandwidth and multiple bandwidths to meet various wireless standards such as GSM, GPS, and WCDMA. Currently, many applications appear which use such various wireless communication systems.

It is expected that a trend in which a plurality of wireless standards are supported by one wireless terminal will be more accelerated. However, in a wireless terminal that supports a plurality of wireless standards, there is a risk that a transmission/reception signal of one wireless standard may be an in-band or out-of-band interference wave of the other wireless standards. Therefore, the effect of insensitivity, the intermodulation distortion, and the secondary distortion due to the in-band or out-of-band interference wave degrade the S/N ratio of a desired signal. Therefore, it is very important to design a wireless system and a circuit by sufficiently considering the interference waves of other systems.

Many SAW filters having a sharp Q value and duplexers have been used to solve the above problem. However, that approach increases cost, therefore, in these few years, techniques for reducing external components as much as possible have been developed. A technique for integrating external components into a chip as on-chip components in order to further reduce cost is becoming a mainstream technique. However, when external components are integrated into a chip as on-chip components, the power consumption increases. It is required to reduce the power consumption, in particular, for applications such as a mobile phone and a wireless game controller, which are desired to be able to be used for a long time.

DETAILED DESCRIPTION

According to an embodiment, a semiconductor integrated circuit compliant with a wireless communication standard in which transmission and reception are performed using a time division method includes an amplifier, an interference wave suppression unit, a coupler and a filter control circuit. An input of the amplifier is connected to an input terminal. A received input signal is inputted into the input terminal. The amplifier outputs an amplified signal. The interference wave suppression unit includes a filter being controlled to be on or off. The filter is configured to suppress an interference wave component of the amplified signal to output the signal as an output signal to an output terminal when the filter is on. The interference wave suppression unit is configured to output the amplified signal as the output signal to the output terminal when the filter is off. The coupler is configured to detect the input signal or the output signal. The filter control circuit is configured to control the filter to be on when a signal level of a detection input signal or a detection output signal detected by the coupler is greater than or equal to a reference value, and configured to control the filter to be off when the signal level is smaller than the reference value, at arbitrary determination timing in a period of time between the transmission and the reception. The period of time is an interference wave detection time period.

Hereinafter, embodiments of the present invention will be described with reference to the drawings. These embodiments are not intended to limit the present invention.

First Embodiment

One of characteristics of the present embodiment is to detect an interference wave signal between transmission and reception (between transmitting packets and receiving packets) and perform control for turning on or off a filter which suppresses the interference wave signal, according to the signal level.

Figure 1:
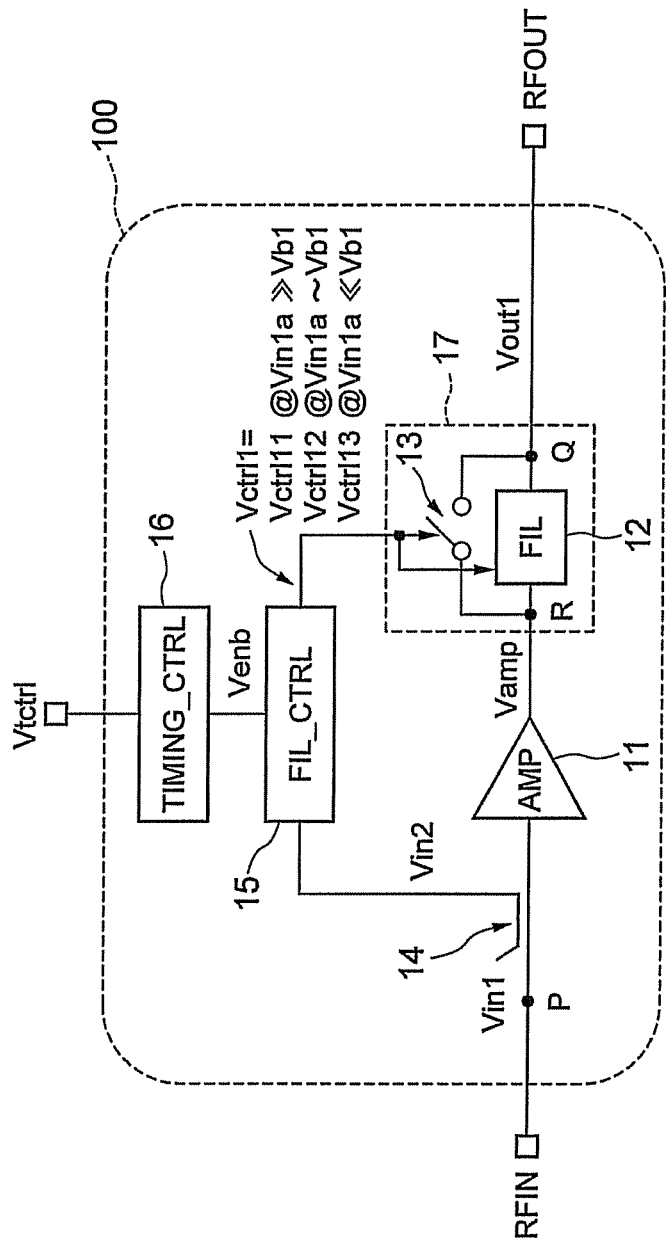
FIG. 1 is a block diagram showing a schematic configuration of an interference wave eliminating system according to a first embodiment of the present invention.

FIG. 1 is a block diagram showing a schematic configuration of an interference wave eliminating system 100 according to the first embodiment of the present invention.

As shown in FIG. 1, the interference wave eliminating system 100 includes an input terminal RFIN, an amplifier (AMP) 11, a filter (FIL) 12, a switch 13, a coupler 14, a filter control circuit (FIL_CTRL) 15, a timing control circuit (TIMING_CTRL) 16, and an output terminal RFOUT. The filter 12 and the switch 13 function as an interference wave suppression unit 17. The interference wave eliminating system 100 can be configured as a semiconductor integrated circuit.

The interference wave eliminating system 100 is used for a wireless communication system compliant with a wireless communication standard in which transmission and reception are performed using a time division method at the same frequency (for example, wireless communication standard such as Bluetooth). In the wireless communication system, the interference wave eliminating system 100 amplifies a reception signal received by an antenna (not shown in the drawings) and outputs the reception signal to a next-stage circuit (such as a mixer, not shown in the drawings).

An input signal Vin1 received by the antenna is inputted into the input terminal RFIN. The input signal Vin1 can contain at least one of frequency components of a reception frequency (desired frequency) frx and an interference frequency fbl. An interference wave signal Sbl is, for example, a signal used for wireless communication in another wireless communication system. The input signal Vin1 does not include a reception signal Srx between transmission and reception.

The input of the amplifier 11 is connected to the input terminal RFIN. The amplifier 11 amplifies an inputted signal and outputs an amplified signal Vamp.

The interference wave suppression unit 17 has the filter 12 and the switch 13. The filter 12 is connected between the output of the amplifier 11 and the output terminal RFOUT. The switch 13 is connected in parallel to the filter 12.

The filter 12 is controlled to be turned on or off by a filter control signal Vctrl1. The filter 12 only has to be controlled to be turned on or off. Either of an active filter formed by using mainly an active element and a passive filter formed by using a passive element can be used as the filter 12. When the filter 12 is on, the filter 12 suppresses an unnecessary component such as an interference wave component of the amplified signal Vamp without suppressing most of a desired wave component and outputs the signal to the output terminal RFOUT as an output signal Vout1. When the filter 12 is off, the filter 12 stops its operation to stop consuming power and outputting signals.

Also, the switch 13 is controlled to be turned on or off by the filter control signal Vctrl1. The switch 13 is turned off when the filter 12 is turned on. When the filter 12 is turned off, the switch 13 is turned on and electrically connects the output of the amplifier 11 and the output terminal RFOUT. As a result, the amplified signal Vamp from the amplifier 11 is outputted to the output terminal RFOUT as the output signal Vout1 via the switch 13.

In other words, the interference wave suppression unit 17 further includes a switch which is connected between the output of the amplifier and the output terminal and which is turned off when the filter is turned on and turned on when the filter is turned off, wherein the filter is connected between the output of the amplifier and the output terminal.

Thus, the interference wave suppression unit 17 is configured to output the amplified signal Vamp to the output terminal RFOUT as the output signal Vout1 when the filter 12 is off.

The coupler 14 is connected to the input terminal RFIN and detects the input signal Vin1.

The filter control circuit 15 controls the filter 12 to be on when the signal level Vin2a of a detection input signal Vin2 detected by the coupler 14 is greater than or equal to a reference value Vb1 and controls the filter 12 to be off when the signal level Vin2a is smaller than the reference value Vb1 at arbitrary timing in a period of time between transmission and reception (between transmitting packets and receiving packets), which is an interference wave detection time period.

The timing control circuit 16 generates an enable signal Venb for starting or ending an interference wave detection operation on the basis of a timing control signal Vtctrl, and outputs the enable signal Venb to the filter control circuit 15. The timing control signal Vtctrl is provided from a baseband unit (not shown in the drawings) in the wireless communication system in which the interference wave eliminating system 100 is used. Since the baseband unit knows the timing of transmission and reception, the baseband unit can output the timing control signal Vtctrl at appropriate timing.

Next, operation timing of the interference wave eliminating system 100 will be described.

Figure 2:
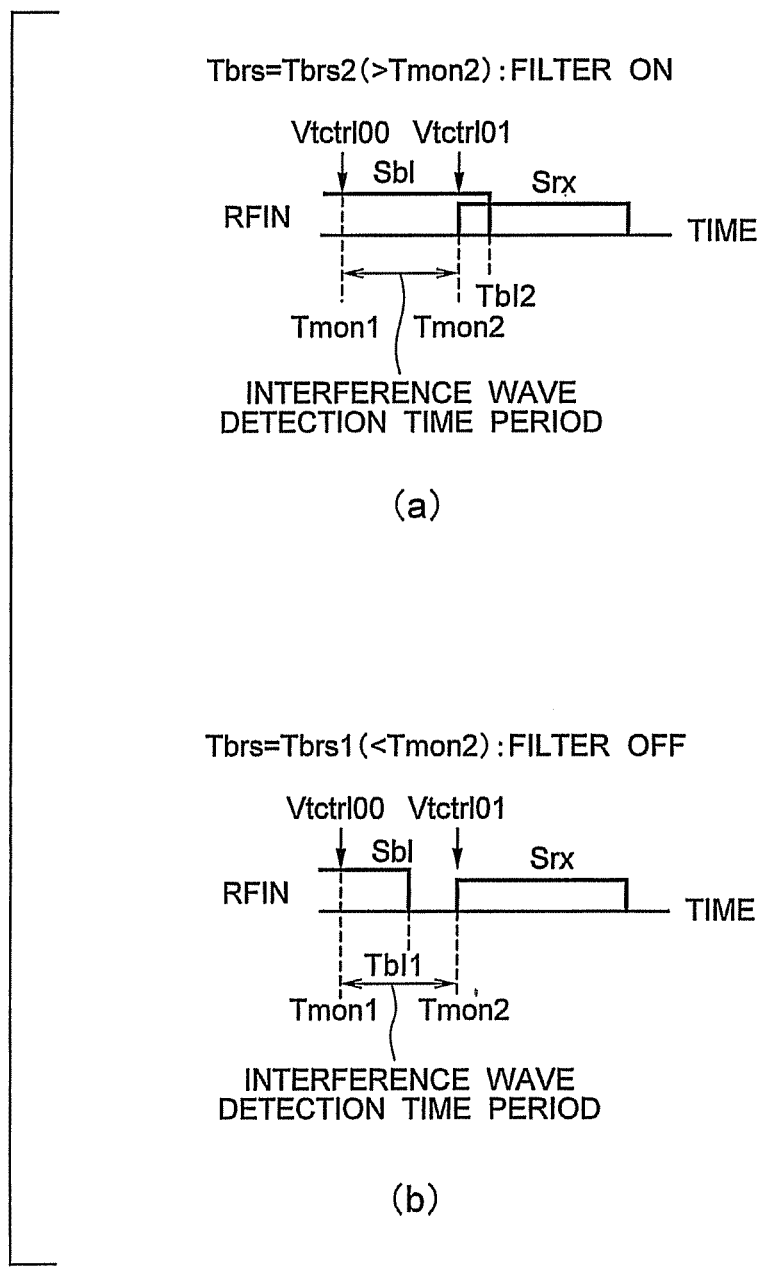
FIG. 2 is a timing diagram for explaining an operation of the interference wave eliminating system according to the first embodiment of the present invention.

FIG. 2 is a timing diagram for explaining an operation of the interference wave eliminating system 100 according to the first embodiment of the present invention. FIG. 2 shows changes with respect to time of signals included in the input signal Vin1 at the input terminal RFIN. As shown in FIG. 2, after a predetermined time interval from when a transmission time period (not shown in the drawings) ends, a reception time period in which the reception signal Srx is included starts at time Tmon2.

FIG. 2(a) is a timing diagram showing a case in which the filter 12 is controlled to be on and the interference wave eliminating system 100 eliminates an interference wave in the reception time period. FIG. 2(b) is a timing diagram showing a case in which the filter 12 is controlled to be off and the interference wave eliminating system 100 does not eliminate an interference wave in the reception time period.

As shown in FIGS. 2(a) and 2(b), at time Tmon1 (detection start timing) before the reception time period starts, the timing control signal Vtctrl (=Vtctrl00) is inputted into the timing control circuit 16. In response, the timing control circuit 16 outputs the enable signal Venb. The filter control circuit 15 into which the enable signal Venb is inputted starts the interference wave detection operation. At this time point, the filter control circuit 15 controls the filter 12 to be off.

Thereafter, at the time Tmon2 (determination timing), the timing control signal Vtctrl (=Vtctrl01) is inputted into the timing control circuit 16. In response, the timing control circuit 16 stops output of the enable signal Venb to the filter control circuit 15. Accordingly, the filter control circuit 15 controls the filter 12 to be on or off at the determination timing. The period of time between the time Tmon1 to the time Tmon2 is the interference wave detection time period.

In the example shown in FIG. 2, the time Tmon2 is set just before the start time of the reception time period. In this case, since information of the interference wave signal Sbl just before the reception time period starts is used, there is a high probability that optimal control on the filter 12 can be performed. However, the time Tmon2 is not necessary to be just before the start time of the reception time period if only it is between the transmission time period and the reception time period. The time Tmon1 and the time Tmon2 may be set, for example, after the reception time period and before the transmission time period.

In an example shown in FIG. 2(a), the input signal Vin1 includes the interference wave signal Sbl until the time Tmon2 which is the end time of the interference wave detection time period. From the time Tmon2 to time Tbl2 in the reception time period, the input signal Vin1 includes the reception signal Srx and the interference wave signal Sbl. In this example, it is assumed that the signal level of the interference wave signal Sbl is a level at which the filter control circuit 15 sets the filter 12 to be on. Therefore, the filter 12 is turned on from off at the time Tmon2, and thereafter, the interference wave signal Sbl in the input signal Vin1 is suppressed by the filter 12. The detail of the above operation will be described below.

In the example shown in FIG. 2(b), the input signal Vin1 includes the interference wave signal Sbl from the time Tmon1 to time Tbl1 before the time Tmon2. The input signal Vin1 includes the reception signal Srx and does not include the interference wave signal Sbl in the reception time period after the time Tmon2. Since there is no interference wave signal Sbl at the time Tmon2, the filter 12 is controlled to be off. In other words, the filter 12 continues to be off. As a result, the power consumption of the interference wave eliminating system 100 can be reduced.

Next, the operation of the interference wave eliminating system 100 will be described in further detail.

(i) Operation in Suppression Area

Figure 3:
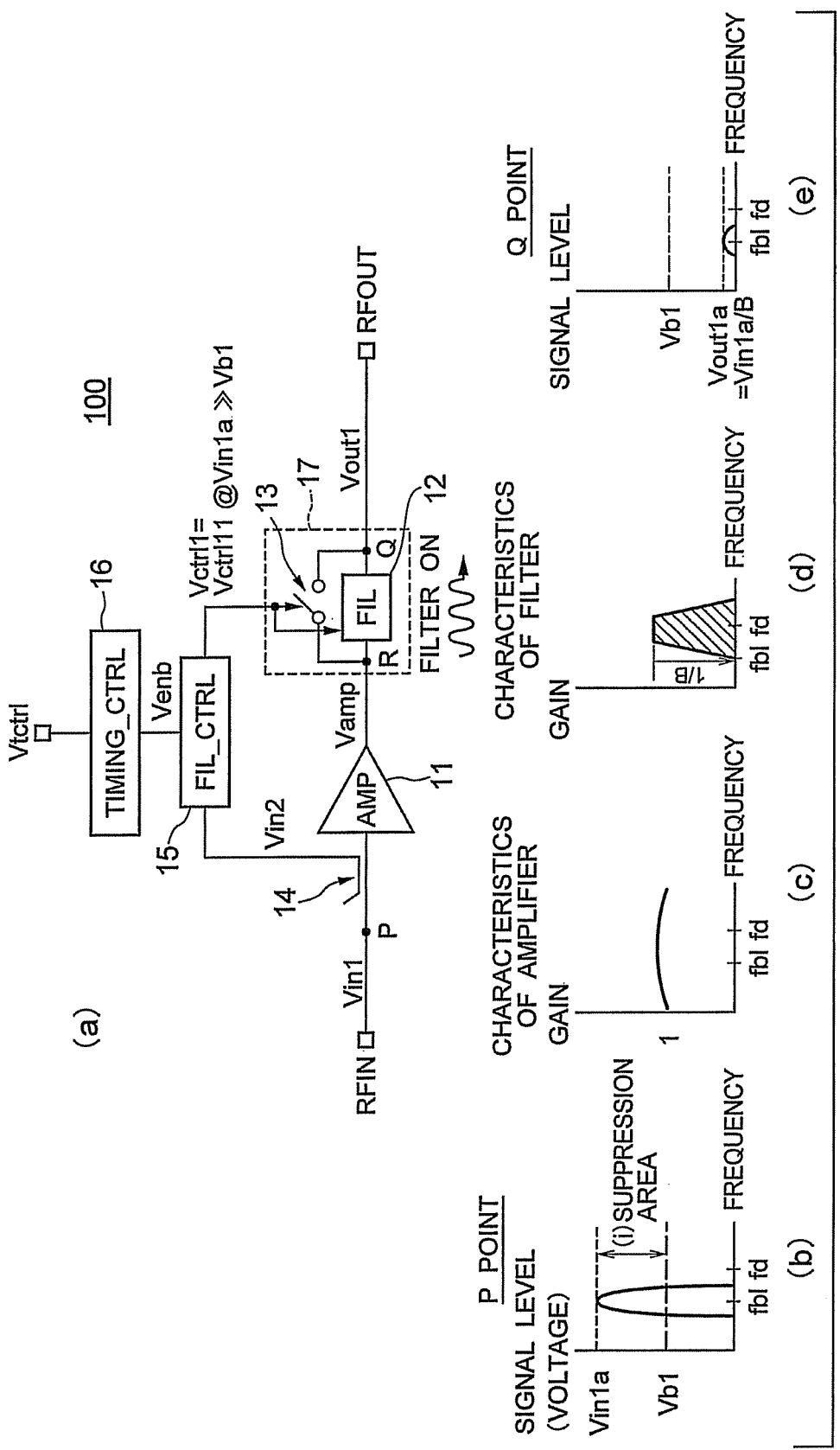
FIG. 3 is a diagram for explaining the operation in a suppression area of the interference wave eliminating system according to the first embodiment of the present invention.

FIG. 3 is a diagram for explaining the operation in a suppression area of the interference wave eliminating system 100 according to the first embodiment of the present invention. FIG. 3 shows an instantaneous operation at the time Tmon2 in FIG. 2(a). At the time Tmon2, the input signal Vin1 includes the interference wave signal Sbl and does not include the reception signal Srx.

FIG. 3(b) is a diagram showing the signal level (voltage) of each frequency component of the input signal Vin1 at a P point (a point at which the signal is monitored). Hereinafter, the center frequency of the interference wave signal Sbl is referred to as a frequency fbl and the center frequency of the desired reception signal Srx is referred to as a frequency fd. The signal level of a component of the frequency fbl is Vin1$a$, which is higher than the reference value Vb1. An area in which the signal level is higher than the reference level Vb1 is the suppression area. The signal level of a component of the frequency fd is 0.

Here, it is assumed that the signal level Vin1$a$ of the input signal Vin1 is substantially the same as the signal level Vin2$a$ of the detection input signal Vin2. Therefore, since the signal level Vin2$a$ is greater than or equal to the reference value Vb1, as shown in FIG. 3(a), the filter control circuit 15 controls the filter 12 to be on and the switch 13 to be off. However, the signal level Vin2$a$ may be lower than the signal level Vin1$a$.

The input signal Vin1 (here, the interference wave signal Sbl) is amplified by the amplifier 11. To clarify the description, as shown in FIG. 3(c), the gain of the amplifier 11 is assumed to be approximately 1 near the frequency fbl and the frequency fd. However, normally, the gain of the amplifier 11 is greater than 1.

The interference wave signal Sbl amplified by the amplifier 11 is suppressed by the filter 12. As shown in FIG. 3(d), it is assumed that the gain of the filter 12 is 1/B at the frequency fbl and approximately 1 at the frequency fd. In the present embodiment, the filter 12 is a band-pass filter.

Therefore, signal levels of each frequency component of the output signal Vout1 at a Q point are as shown in FIG. 3(e). The signal level Vout1$a$ of a component of the frequency fbl is Vin1$a$/B. In other words, the interference wave signal Sbl inputted as the input signal Vin1 is suppressed and outputted. The signal level of a component of the frequency fd is 0.

In this state, if the reception time period after the time Tmon2 starts and the interference wave signal Sbl and the reception signal Srx are inputted as the input signal Vin1, the interference wave signal Sbl is suppressed and outputted and the reception signal Srx is outputted without change. Therefore, there is no risk that the S/N ratio of the reception signal (desired wave signal) Srx is degraded at the next-stage circuit.

(ii) Operation in Non-Suppression Area

Figure 4:
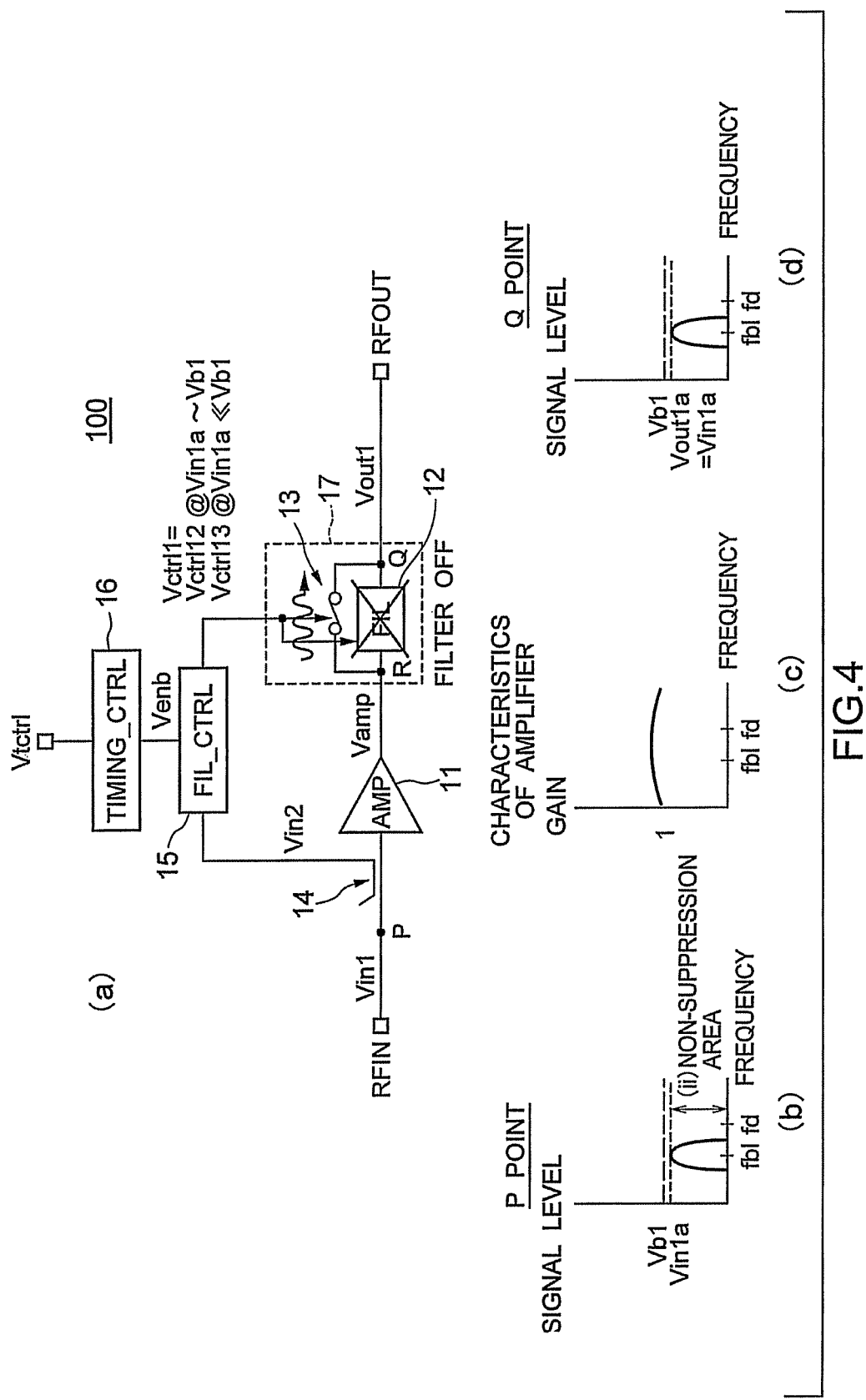
FIG. 4 is a diagram for explaining the operation in a non-suppression area of the interference wave eliminating system according to the first embodiment of the present invention.

FIG. 4 is a diagram for explaining the operation in a non-suppression area of the interference wave eliminating system 100 according to the first embodiment of the present invention. Here, the operation timing is the same as that of the case (i) described above, but the signal level of the interference wave signal Sbl is different from that of the case (i).

In the non-suppression area, the signal level of the interference wave signal Sbl is smaller than the reference value Vb1. Therefore, as shown in FIG. 4(a), the filer 12 is turned off and the switch 13 is turned on.

FIG. 4(b) is a diagram showing the signal level (voltage) of each frequency component of the input signal Vin1 at the P point. The signal level Vin1$a$ of a component of the frequency fbl is lower than the reference value Vb1. The signal level of a component of the frequency fd is 0.

The input signal Vin1 (here, the interference wave signal Sbl) is amplified by the amplifier 11. As in the case (i), the gain of the amplifier 11 is assumed to be approximately 1 near the frequency fbl and the frequency fd (FIG. 4(c)).

The interference wave signal Sbl amplified by the amplifier 11 is outputted to the output terminal RFOUT via the switch 13.

Therefore, the signal level of each frequency component of the output signal Vout1 at the Q point is as shown in FIG. 4(d). The signal level Vout1$a$ of a component of the frequency fbl is Vin1$a$. In other words, the interference wave signal Sbl inputted as the input signal Vin1 is outputted without change. The signal level of a component of the frequency fd is 0.

In this state, if the reception time period starts, the interference wave signal Sbl and the reception signal Srx inputted as the input signal Vin1 are outputted without change. Since the signal level of the interference wave signal Sbl is sufficiently low, there is no risk that the S/N ratio of the reception signal Srx is degraded at the next-stage circuit in the interference wave eliminating system 100.

Next, a detailed configuration of the interference wave eliminating system 100 will be described.

Figure 5:
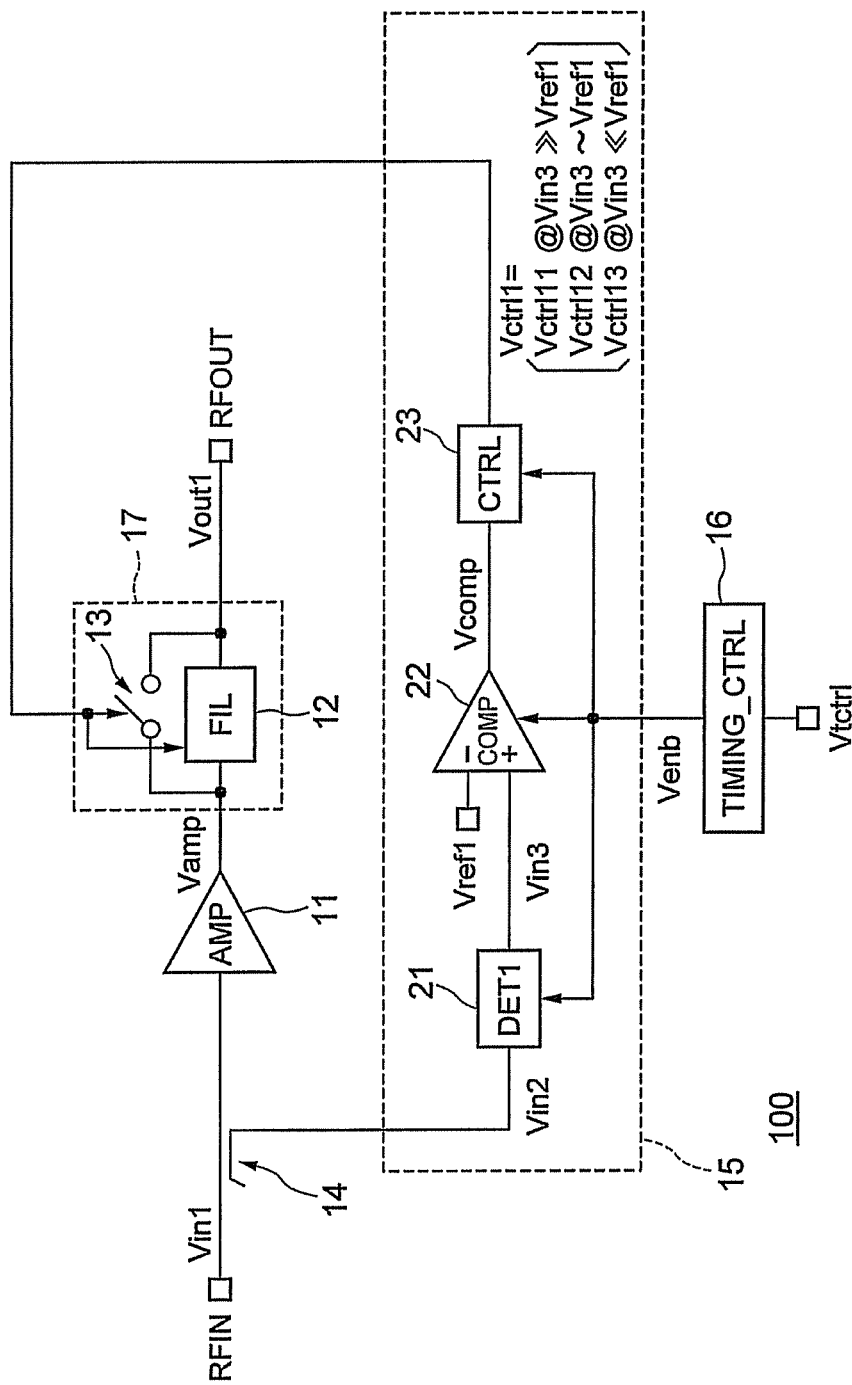
FIG. 5 is a block diagram showing a detailed configuration of the interference wave eliminating system according to the first embodiment of the present invention.

FIG. 5 is a block diagram showing a detailed configuration of the interference wave eliminating system 100 according to the first embodiment of the present invention. FIG. 5 shows a detailed configuration of the filter control circuit 15. The other constituent elements are the same as those in FIG. 1, thus, the same constituent elements are given the same reference symbols and the description thereof will be omitted.

The filter control circuit 15 has a detector (DET1) 21, a comparator (COMP) 22, and a control signal output circuit (CTRL) 23.

The detector 21 outputs a direct current detection voltage Vin3 according to the signal level Vin2$a$ of the detection input signal Vin2.

The comparator 22 compares the detection voltage Vin3 with a reference voltage Vref1 corresponding to the reference value Vb1, and outputs a comparison result Vcomp. A DC level corresponding to a signal level that should be recognized as the interference wave signal Sbl in the wireless communication system in which the interference wave eliminating system 100 is used is set as the reference voltage Vref1 in advance. In this case, a margin of several dB is provided to the signal level of the assumed interference wave signal Sbl.

Figure 6:
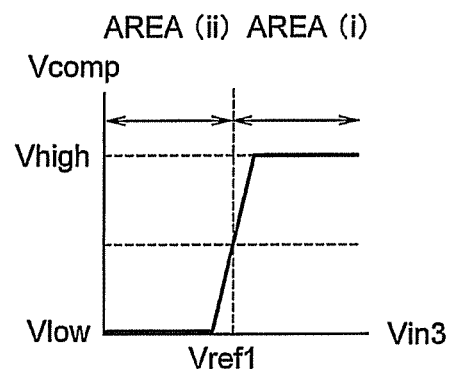
FIG. 6 is a diagram showing characteristics of a comparator of an interference wave eliminating system according to the first embodiment of the present invention.

As shown in FIG. 6, when the detection voltage Vin3 is smaller than Vref1, the comparator 22 outputs the comparison result Vcomp of low level (voltage Vlow). This corresponds to the non-suppression area (ii). When the detection voltage Vin3 is greater than or equal to Vref1, the comparator 22 outputs the comparison result Vcomp of high level (voltage Vhigh). This corresponds to the suppression area (i).

The control signal output circuit 23 outputs the filter control signal Vctrl1 for controlling the filter 12 and the switch 13 to be on or off at the determination timing (Tmon2) according to the comparison result Vcomp. Specifically, when the detection voltage Vin3 is sufficiently greater than the reference voltage Vref1, the control signal output circuit 23 outputs the filter control signal Vctrl1 (=Vctrl11) to control the filter 12 to be on. When the detection voltage Vin3 is sufficiently smaller than the reference voltage Vref1, the control signal output circuit 23 outputs the filter control signal Vctrl1 (=Vctrl13) to control the filter 12 to be off.

The control signal output circuit 23 has a memory function and is a circuit such as, for example, a register.

Operation of each of the detector 21, the comparator 22, and the control signal output circuit 23 is controlled by the enable signal Venb from the timing control circuit 16.

Specifically, the detector 21, the comparator 22, and the control signal output circuit 23 start operation at the detection start timing (Tmon1) at which the enable signal Venb is inputted. Accordingly, the control signal output circuit 23 starts accumulation of the comparison results Vcomp from the comparator 22.

The detector 21 and the comparator 22 stop operation when an inverted signal of the enable signal Venb is inputted. The control signal output circuit 23 decides the filter control signal Vctrl1 on the basis of the comparison result Vcomp at the timing at which the inverted signal of the enable signal Venb is inputted (determination timing: Tmon2) and holds the filter control signal Vctrl1.

If the comparison result Vcomp of the comparator 22 fluctuates and is not stable because the detection voltage Vin3 is nearly the same as the reference voltage Vref1 before the determination timing and it takes some time to determine which is greater, the control signal output circuit 23 outputs the filter control signal Vctrl1 (=Vctrl12) to forcibly turn off the filter 12 at the determination timing. For this purpose, as described above, the reference voltage Vref1 is set by providing a margin of several dB to the signal level that should be recognized as the interference wave signal Sbl.

As a result, it is possible to prevent the entire interference wave eliminating system 100 from operating unstably. Further, it is possible to prevent such incident as the filter 12 being turned on even when the influence of the interference wave on the wireless communication system is small, so that useless power consumption can be reduced.

Next, an example of a circuit configuration of the coupler 14 and the detector 21 will be described.

Figure 7:
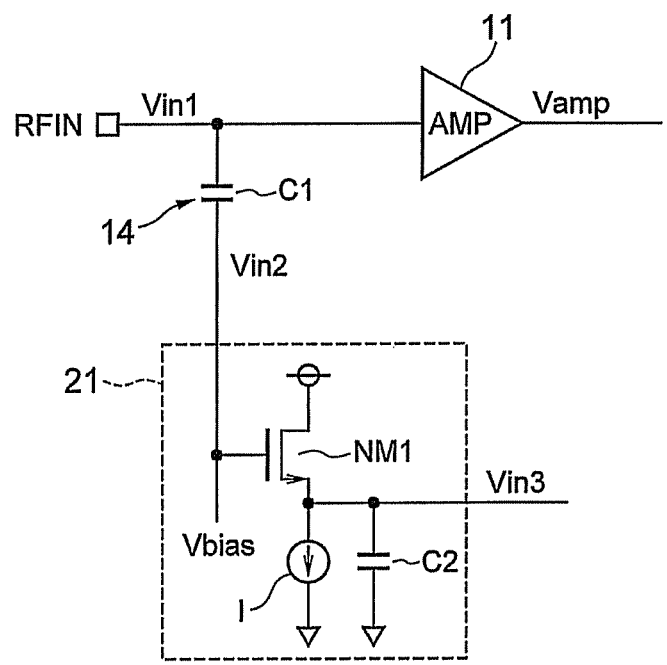
FIG. 7 is a circuit diagram of a coupler and a detector of the interference wave eliminating system according to the first embodiment of the present invention.

FIG. 7 is a circuit diagram of the coupler 14 and the detector 21 of the interference wave eliminating system 100 according to the first embodiment of the present invention. As shown in FIG. 7, the coupler 14 is formed by a capacitor C1. One terminal of the capacitor C1 is connected to the input terminal RFIN and the input of the amplifier 11.

The detector 21 has an N-type MOS transistor NM1, a current source I, and a capacitor C2. The gate of the N-type MOS transistor NM1 is connected to the other terminal of the capacitor C1 and receives the detection input signal Vin2. A bias voltage Vbias is also supplied to the gate of the N-type MOS transistor NM1. A power source voltage is supplied to the drain of the N-type MOS transistor NM1. The source of the N-type MOS transistor NM1 is grounded via the current source I. One terminal of the capacitor C2 is connected to the source of the N-type MOS transistor NM1 and the other terminal is grounded. By this configuration, the detection voltage Vin3 according to the signal level of the detection input signal Vin2 is outputted from the source of the N-type MOS transistor NM1.

As described above, according to the present embodiment, the filter 12 is controlled to be on or off according to the signal level Vin2a of the detection input signal Vin2 corresponding to the input signal Vin1, at arbitrary timing in a period of time between transmission and reception, which is the interference wave detection time period. Therefore, if the influence of the interference wave to the wireless communication system is large, it is possible to eliminate the interference wave signal Sbl by turning on the filter 12. If the influence of the interference wave to the wireless communication system is small, it is possible to reduce the power consumption by turning off the filter 12 and outputting the amplified signal Vamp without change. In this case, since the reception signal Srx does not pass through the filter 12, the loss of the reception signal Srx can be reduced. Therefore, the sensitivity of the wireless communication system can be improved.

In summary, the filter 12 for eliminating the interference wave signal Sbl is integrated into a semiconductor chip as an on-chip component, so that the semiconductor integrated circuit can be downsized and can be made less expensive, and further, the power consumption thereof can be reduced.

Further, the interference wave signal Sbl is detected in the period of time between transmission and reception in which the reception signal Srx is not included in the input signal Vin1, so that even the interference wave signal Sbl in a frequency band near the frequency band of the reception signal Srx can be correctly detected.

Furthermore, the detector 21 and the comparator 22 stop operation in a period of time other than the interference wave detection time period, so that the power consumption can be reduced.

(Modified Example of the First Embodiment)

The interference wave suppression unit 17 can also be configured as described below.

Figure 8:
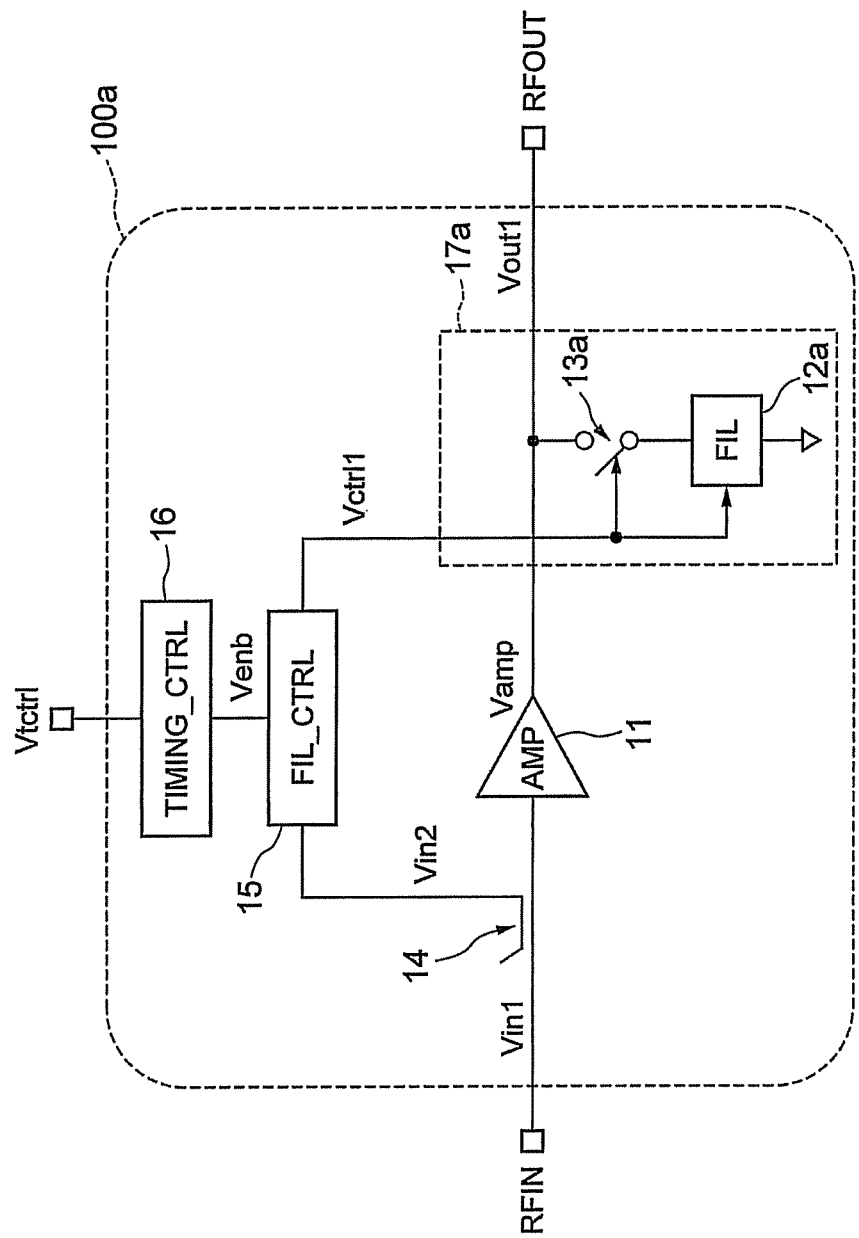
FIG. 8 is a block diagram of an interference wave eliminating system according to a modified example of the first embodiment of the present invention.

FIG. 8 is a block diagram of an interference wave eliminating system 100a according to a modified example of the first embodiment of the present invention. Constituent elements other than those of the interference wave suppression unit 17a are the same as those of FIG. 1, therefore, the same constituent elements are given the same reference symbols and the description thereof will be omitted.

The interference wave suppression unit 17a has the filter 12a and the switch 13a. One terminal of the switch 13a is connected to the output of the amplifier 11 and the output terminal RFOUT. The filter 12a is connected between the other terminal of the switch 13a and the ground. When the filter 12a is turned on, the switch 13a is turned on, and when the filter 12a is turned off, the switch 13a is turned off. The filter 12a is an active filter or a passive filter. When the filter 12a is on, the filter 12a suppresses an interference wave component and hardly affects the other frequency components. In other words, the filter 12a is a notch filter.

Specifically, one terminal of the interference wave suppression unit further includes a switch one terminal of which is connected to the output of the amplifier and the output terminal, and which is turned on when the filter is turned on and turned off when the filter is turned off, wherein the filter is connected between the other terminal of the switch and the ground.

Also by this configuration, the interference wave suppression unit 17a suppresses the interference wave component of the amplified signal Vamp and outputs the obtained signal to the output terminal RFOUT as the output signal Vout1 when the filter 12a is on. The interference wave suppression unit 17a outputs the amplified signal Vamp to the output terminal RFOUT as the output signal Vout1 when the filter 12a is off. Therefore, the same effect as that of the first embodiment can be obtained.

The coupler 14 can also be formed by a transformer T1 or the like.

Figure 9:
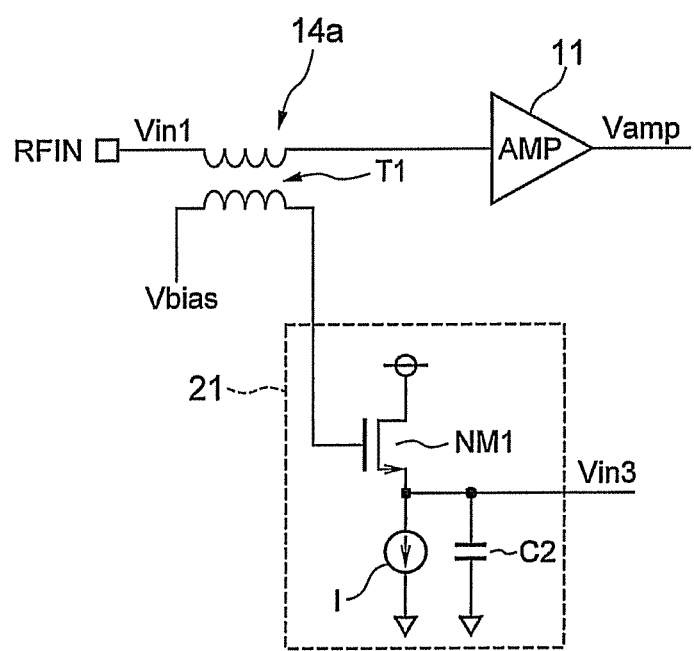
FIG. 9 is a circuit diagram of a coupler and a detector of the interference wave eliminating system according to the modified example of the first embodiment of the present invention.

FIG. 9 is a circuit diagram of the coupler 14a and the detector 21 of the interference wave eliminating system 100a according to the modified example of the first embodiment of the present invention.

As shown in FIG. 9, the coupler 14a is formed by the transformer T1. One terminal of the primary side of the transformer T1 is connected to the input terminal RFIN. The other terminal of the primary side of the transformer T1 is connected to the input of the amplifier 11. A bias voltage Vbias is supplied to one terminal of the secondary side of the transformer T1. The other terminal of the secondary side of the transformer T1 is connected to the gate of the N-type MOS transistor NM1. Since the other constituent elements are the same as those in FIG. 7, the same constituent elements are given the same reference symbols and the description thereof will be omitted.

Also by such a configuration, the same effect as that of the first embodiment can be obtained.

Second Embodiment

The second embodiment is different from the first embodiment in a point that the enable signal Venb is not inputted into the detector and the comparator.

Figure 10:
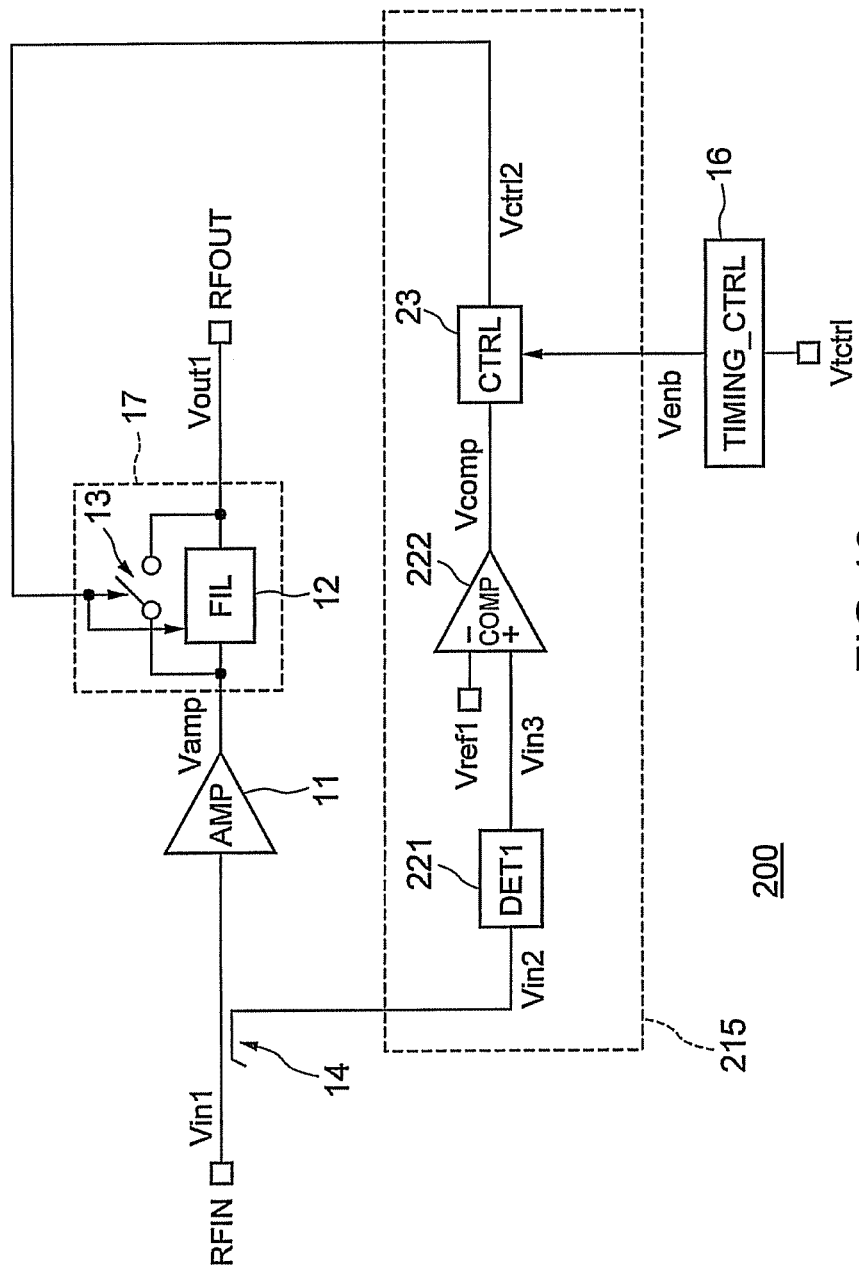
FIG. 10 is a block diagram showing a configuration of an interference wave eliminating system according to a second embodiment of the present invention.

FIG. 10 is a block diagram showing a configuration of an interference wave eliminating system 200 according to the second embodiment of the present invention. As shown in FIG. 10, in the filter control circuit 215, the enable signal Venb is not inputted into the detector 221 and the comparator 222. Since the other constituent elements are the same as those of the interference wave eliminating system 100 in FIG. 5, the same constituent elements are given the same reference symbols and the description thereof will be omitted.

The detector 221 and the comparator 222 also operate when it is not the interference wave detection time period. Therefore, the power consumption of the interference wave eliminating system 200 is somewhat larger than that of the interference wave eliminating system 100 of the first embodiment. However, since the timing control circuit 16 only has to control the operation of the control, signal output circuit 23, the control is easier than the first embodiment.

The other operations are the same as those of the first embodiment. Therefore, the same effect as that of the first embodiment can also be obtained.

Third Embodiment

The third embodiment is different from the first embodiment in a point that the coupler is connected to the output terminal RFOUT.

Figure 11:
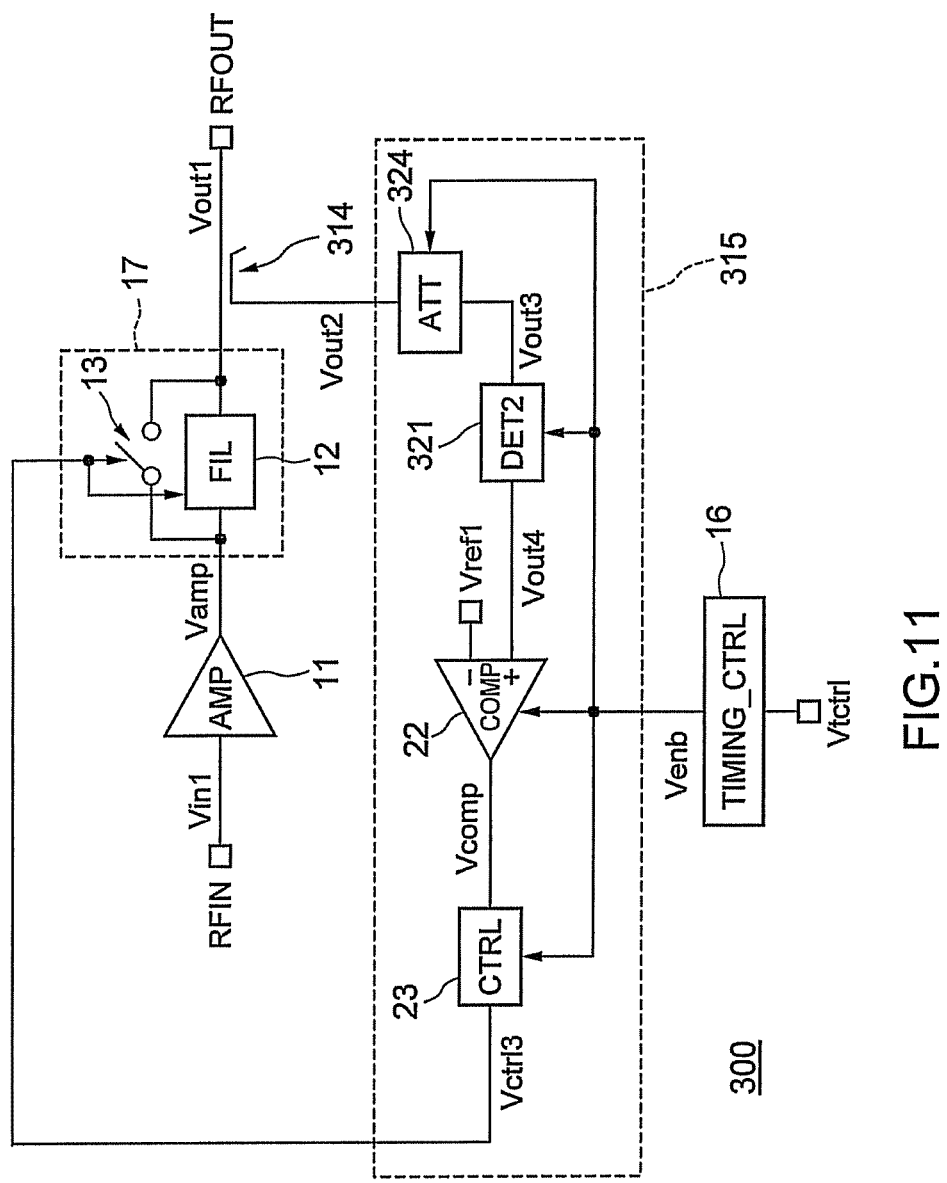
FIG. 11 is a block diagram showing a configuration of an interference wave eliminating system according to a third embodiment of the present invention.

FIG. 11 is a block diagram showing a configuration of an interference wave eliminating system 300 according to the third embodiment of the present invention.

The coupler 314 is connected to the output terminal RFOUT and detects the output signal Vout1.

An attenuator (ATT) 324 attenuates a detection output signal Vout2 detected by the coupler 314 and outputs an attenuated signal Vout3. The attenuator 324 can be formed by, for example, a capacitor, a resistor, a MOSFET, or the like. The amount of attenuation of the attenuator 324 is set to offset the gain of the amplifier 11. However, the amount of attenuation of the attenuator 324 may be set different from the gain of the amplifier 11, and the reference voltage Vref1 may be shifted by a gain difference between the attenuator 324 and the amplifier 11.

The detector 321 outputs a direct current detection voltage Vout4 according to the signal level of the attenuated signal Vout3.

The comparator 22 compares the detection voltage Vout4 with the reference voltage Vref1 and outputs a comparison result Vcomp.

Since the other constituent elements are the same as those of the interference wave eliminating system 100 in FIG. 5, the same constituent elements are given the same reference symbols and the description thereof will be omitted.

In the above configuration, the control of the filter 12 is performed in the same manner as that in the first embodiment. Specifically, the operation of the control signal output circuit 23 in the case where the reference voltage Vref1 is nearly the same as the detection voltage Vout4 is the same as that of the first embodiment.

According to the present embodiment, the loss of the input signal Vin1 is smaller than that of the first embodiment because the coupler 14 is not connected to the input terminal RFIN. Therefore, NF (Noise Figure) is improved compared with the first embodiment, thus, the reception sensitivity of the wireless communication system can be improved.

The same effect as that of the first embodiment can also be obtained.

Fourth Embodiment

The fourth embodiment is different from the third embodiment in a point that the enable signal Venb is not inputted into the detector and the comparator.

Figure 12:
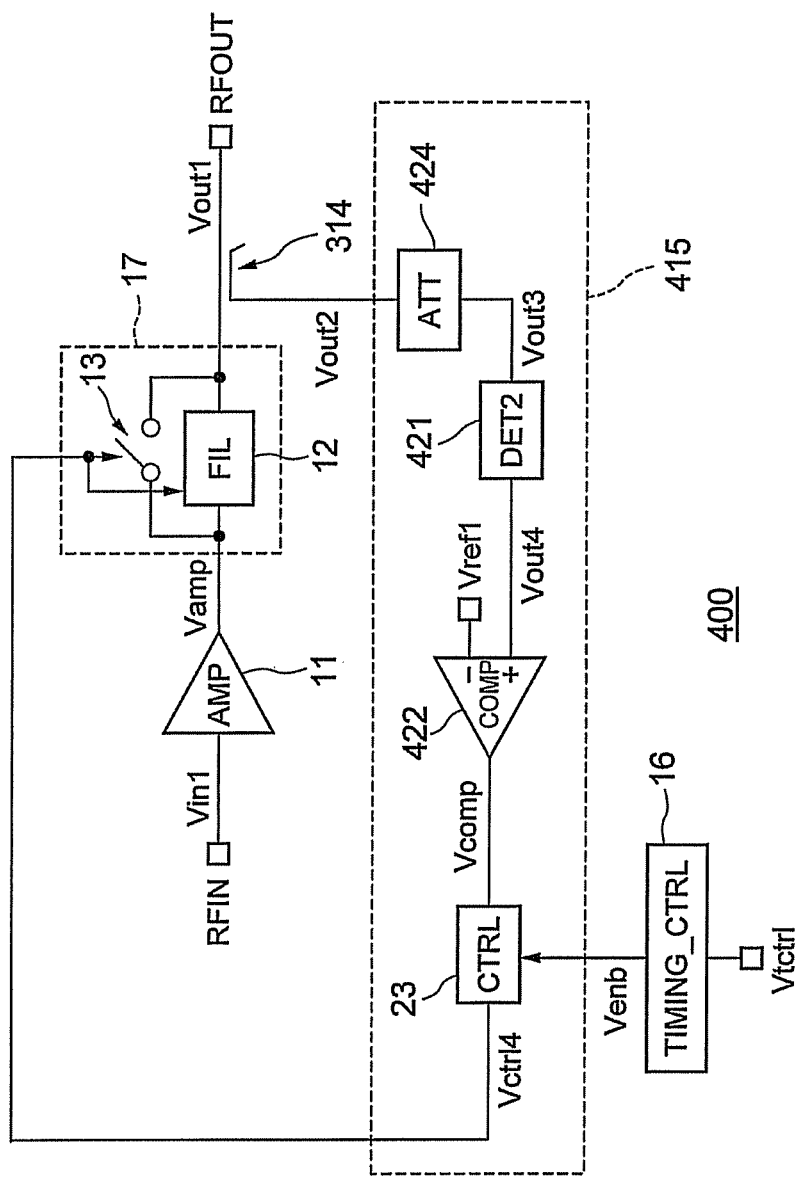
FIG. 12 is a block diagram showing a configuration of an interference wave eliminating system according to a fourth embodiment of the present invention.

FIG. 12 is a block diagram showing a configuration of an interference wave eliminating system 400 according to the fourth embodiment of the present invention. As shown in FIG. 12, in the filter control circuit 415, the enable signal Venb is not inputted into the attenuator 424, the detector 421, and the comparator 422. Since the other constituent elements are the same as those of the interference wave eliminating system 300 in FIG. 11, the same constituent elements are given the same reference symbols and the description thereof will be omitted.

The attenuator 424, the detector 421, and the comparator 422 also operate when it is not the interference wave detection time period. Therefore, the power consumption of the interference wave eliminating system 400 is somewhat larger than that of the interference wave eliminating system 300 of the third embodiment. However, since the timing control circuit 16 only has to control the operation of the control signal output circuit 23, the control is easier than the third embodiment.

The other operations are the same as those of the third embodiment. Therefore, the same effect as that of the third embodiment can also be obtained.

Fifth Embodiment

The fifth embodiment is different from the first embodiment in a point that the filter 12 is controlled on the basis of a difference between the signal level of the input signal Vin1 and the signal level of the output signal Vout1.

Figure 13:
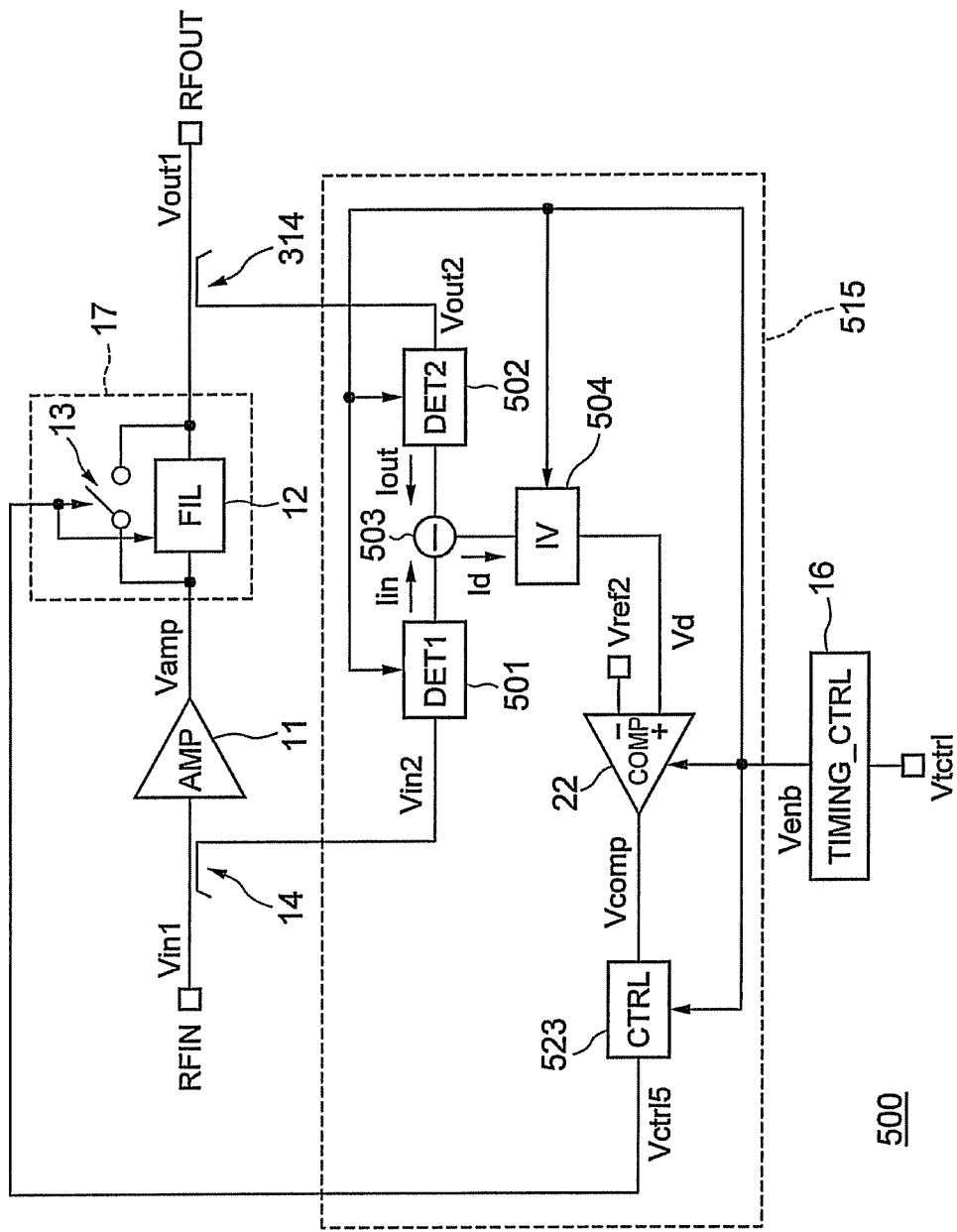
FIG. 13 is a block diagram showing a configuration of an interference wave eliminating system according to a fifth embodiment of the present invention.

FIG. 13 is a block diagram showing a configuration of an interference wave eliminating system 500 according to the fifth embodiment of the present invention. As shown in FIG. 13, the interference wave eliminating system 500 further includes the coupler 314 in the interference wave eliminating system 100 of FIG. 5. The configuration of the filter control circuit 515 is different from that of the filter control circuit 15 in the interference wave eliminating system 100 of FIG. 5. Since the other constituent elements are the same as those of the interference wave eliminating system 100 in FIG. 5, the same constituent elements are given the same reference symbols and the description thereof will be omitted.

The coupler (first coupler) 14 is connected to the input terminal RFIN and detects the input signal Vin1.

The coupler (second coupler) 314 is connected to the output terminal RFOUT and detects the output signal Vout1.

The filter control circuit 515 controls the filter 12 to be on when a subtraction signal level obtained by subtracting a signal level of the detection output signal Vout2 detected by the coupler 314 from the signal level of the detection input signal Vin2 detected by the coupler 14 is greater than or equal to a reference value Vb2 and controls the filter 12 to be off when the subtraction signal level is smaller than the reference value Vb2, at arbitrary timing in a period of time between transmission and reception, which is the interference wave detection timing period.

In the present embodiment, the filter control circuit 515 has an input signal detector 501, an output signal detector 502, a subtractor 503, a current-voltage conversion circuit (IV) 504, the comparator 22, and a control signal output circuit 523.

The input signal detector 501 outputs an input detection current Iin according to the signal level Vin2a of the detection input signal Vin2 from the coupler 14. The output signal detector 502 outputs an output detection current Iout according to the signal level Vout2a of the detection output signal Vout2 from the coupler 314.

The subtractor 503 subtracts the output detection current Iout from the input detection current Iin and outputs the subtraction result as a subtraction current Id. The current-voltage conversion circuit 504 converts the subtraction current Id into a detection voltage Vd. The comparator 22 compares the detection voltage Vd with a reference voltage Vref2 corresponding to the reference value Vb2, and outputs a comparison result Vcomp.

The operation of the interference wave eliminating system 500 will be described.

When the timing control signal Vtctrl (=Vtctrl00) is inputted into the timing control circuit 16, the timing control circuit 16 outputs the enable signal Venb. The timing control signal Vtctrl is inputted at the same timing as that in the first embodiment. When the enable signal Venb is inputted into the control signal output circuit 523, the control signal output circuit 523 controls the filter 12 to be on. At this timing, the input signal detector 501, the output signal detector 502, the subtractor 503, the current-voltage conversion circuit 504, and the comparator 22 start operation.

In the interference wave detection time period, if the interference wave signal Sbl is not inputted as the input signal Vin1, signal levels of the input signal Vin1 and the output signal Vout1 are low and substantially the same. Therefore, the input detection current Iin of the input signal detector 501 and the output detection current Iout of the output signal detector 502 are small and substantially the same.

As a result, since the subtraction current Id is small, the detection voltage Vd is low. The reference voltage Vref2 is set higher than the detection voltage Vd of this case in advance. The control signal output circuit 523 controls the filter 12 to be off on the basis of the comparison result Vcomp of the comparator 22 (low level) at the timing at which the timing control signal Vtctrl (=Vtctrl01) is inputted into the timing control circuit 16.

On the other hand, in the interference wave detection time period, if the interference wave signal Sbl is inputted as the input signal Vin1, the signal level of the input signal Vin1 is high. Since the interference wave signal Sbl is suppressed by the filter 12, the signal level of the output signal Vout1 is low. Therefore, the input detection current Iin of the input signal detector 501 is large, and the output detection current Iout of the output signal detector 502 is small. As a result, since the subtraction current Id is large, the detection voltage Vd is high. The reference voltage Vref2 is set lower than the detection voltage Vd of this case in advance. Here, the subtraction current Id and the detection voltage Vd indicate the amount of suppression of the interference wave at the filter 12.

The control signal output circuit 523 controls the filter 12 to be on based on the comparison result Vcomp of the comparator 22 (high level) at the timing at which the timing control signal Vtctrl (=Vtctrl01) is inputted into the timing control circuit 16. In other words, the filter 12 continues to be on.

After the determination timing, the input signal detector 501, the output signal detector 502, the subtractor 503, the current-voltage conversion circuit 504, the comparator 22, and the control signal output circuit 523 stop operation, so that the power consumption can be reduced.

The other operations are the same as those of the first embodiment. Specifically, the operation of the control signal output circuit 523 in the case where the reference voltage Vref2 is nearly the same as the detection voltage Vd is also the same as that of the first embodiment.

According to the present embodiment, the same effect as that of the first embodiment can be obtained.

The configuration of the present embodiment may be modified so that the input signal detector 501 outputs an input detection voltage, the output signal detector 502 outputs an output detection voltage, and the subtractor 503 outputs a difference between these voltages as the detection voltage Vd. In this case, the current-voltage conversion circuit 504 is not necessary.

Also, the configuration of the present embodiment may be modified so that the amount of attenuation of the filter 12 is adjusted on the basis of the amount of suppression of the interference wave detected by the detection voltage Vd. This configuration is effective when the amount of attenuation of the filter 12 varies. For example, when the signal level of the input signal Vin1 is greater than or equal to the reference value Vb2 and the amount of suppression of the interference wave is greater than or equal to the maximum amount of suppression, the filter 12 may be turned on after the amount of attenuation of the filter 12 is reduced. In that case, the power consumption can be reduced. When the signal level of the input signal Vin1 is greater than or equal to the reference value Vb2 and the amount of suppression of the interference wave is smaller than or equal to the minimum amount of suppression, the filter 12 may be turned on after the amount of attenuation of the filter 12 is increased. In that case, a necessary amount of suppression of the interference wave can be secured even if the amount of attenuation of the filter 12 varies.

As in the first embodiment, when the signal level of the input signal Vin1 is smaller than the reference value Vb2, the filter 12 is controlled to be off.

By using the configuration described above, the power consumption can be reduced more than the first to the fourth embodiments, while securing a necessary amount of suppression of the interference wave.

Other Modified Embodiments

Although the filter 12 is a band-pass filter in the description of the above embodiments, the filter 12 may be a band-elimination filter, for example.

The modified example of the first embodiment may be applied to the second to the fifth embodiments.

According to the embodiments described above, an interference wave can be reduced with low power consumption.

Comparative Examples

Hereinafter, comparative examples which have come to the knowledge of the inventor will be described.

There are several methods for eliminating an interference wave in an IC. Typical configurations of these include a configuration in which an active filter having a high Q value is used (FIG. 14(a)) and a configuration in which an interference wave is eliminated by using a feed-forward method (FIG. 14(b)).

Figure 14:
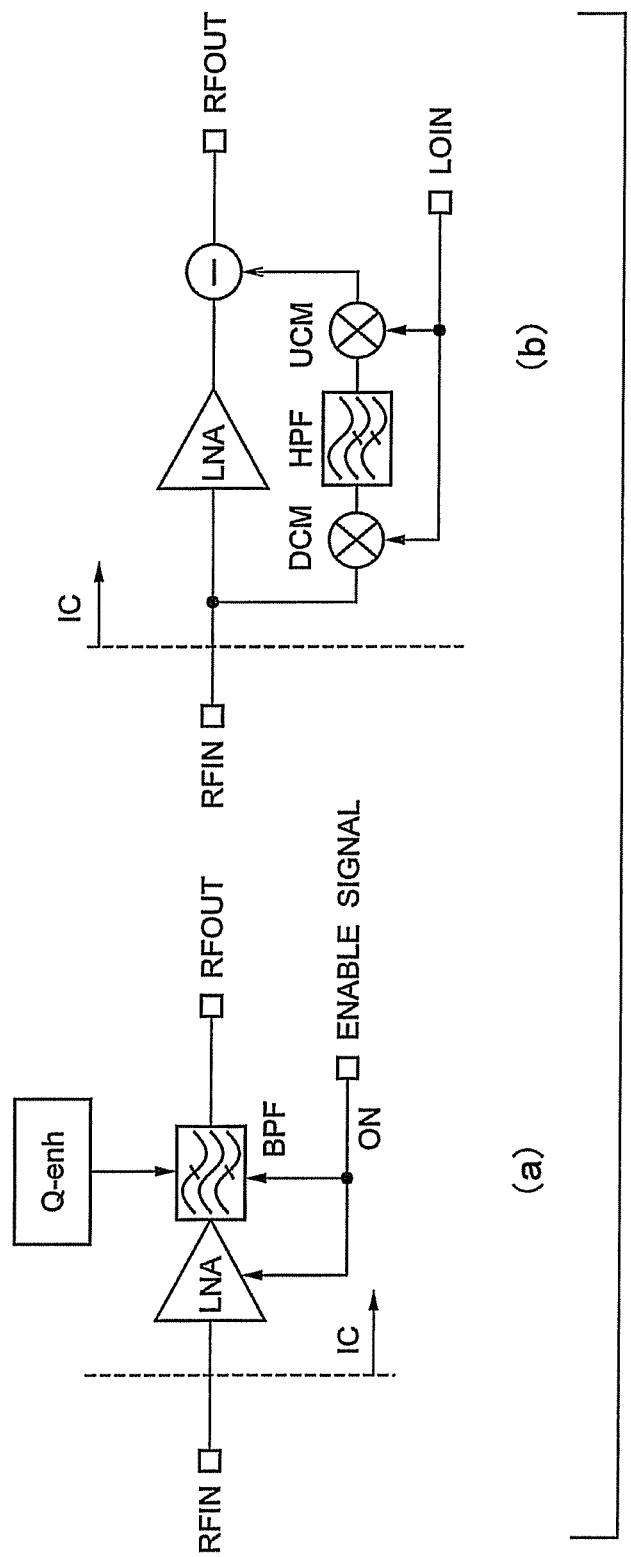
FIG. 14 is a block diagram showing a configuration of an interference wave eliminating system according to a comparative example.

In the configuration of FIG. 14(a), an on-chip active filter BPF is connected to the next stage of a low noise amplifier LNA.

Methods for increasing the Q value are employed so that the active filter BPF has a high Q value. Generally, to offset the loss in an LC tank circuit, a negative resistance circuit Q-enh, which is used in a voltage-controlled oscillator (VCO), is used. However, when the Q value of an inductor is low, to increase the Q value of an active filter BPF having a small area, a lot more current is required. Further, since the active filter operates at all times, the power consumption increases.

In a configuration of FIG. 14(b), an interference wave signal is subtracted at an output portion of a low noise amplifier LNA and only a desired wave signal is extracted. More specifically, a desired wave signal (frequency is frf) and an interference wave signal (frequency is fbl) inputted from the input terminal RFIN are down-converted by a down-conversion mixer DCM by using an internal local signal (frequency is flo (≈frf)). As a result, the desired wave signal is converted into a signal near DC and the interference wave signal is converted into a signal of low frequency (flo−fbl). A high-pass filter HPF extracts only the signal of low frequency corresponding to the interference wave signal from these signals. Thereafter, an up-conversion mixer UCM up-converts the extracted signal of low frequency (flo−fbl) by using a local signal (frequency is flo) and obtains only the interference wave signal. Then, the obtained interference wave signal is subtracted from an output signal of the low noise amplifier LNA. However, since this configuration uses two mixers, the area increases as well as the power consumption increases.

In summary, the configurations of the comparative examples consume more power than the embodiments described above.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A semiconductor integrated circuit compliant with a wireless communication standard in which transmission and reception are performed using a time division method, the semiconductor integrated circuit comprising:
    an amplifier, an input of the amplifier being connected to an input terminal, a received input signal being inputted into the input terminal, the amplifier outputting an amplified signal;
    an interference wave suppression unit comprising a filter being controlled to be on or off, the filter configured to suppress an interference wave component of the amplified signal to output the signal as an output signal to an output terminal when the filter is on, the interference wave suppression unit configured to output the amplified signal as the output signal to the output terminal when the filter is off;
    a coupler configured to detect the input signal or the output signal; and
    a filter control circuit configured to control the filter to be on when a signal level of a detection input signal or a detection output signal detected by the coupler is greater than or equal to a reference value, and configured to control the filter to be off when the signal level is smaller than the reference value, at arbitrary determination timing in a period of time between the transmission and the reception, the period of time being an interference wave detection time period.

2. The semiconductor integrated circuit according to claim 1, wherein
    the filter control circuit comprises
    a detector configured to output a detection voltage according to the signal level of the detection input signal or the detection output signal,
    a comparator configured to compare the detection voltage with a reference voltage corresponding to the reference value, and configured to output a comparison result, and
    a control signal output circuit configured to output a filter control signal controlling the filter to be on or off, according to the comparison result, at the determination timing.

3. The semiconductor integrated circuit according to claim 2, wherein
    the detector, the comparator, and the control signal output circuit start operation at detection start timing in the interference wave detection time period, the detection start timing being earlier than the determination timing, and
    the control signal output circuit outputs the filter control signal controlling the filter to be off at the determination timing, if the comparison result is unstable before the determination timing.

4. The semiconductor integrated circuit according to claim 2, further comprising:
    a timing control circuit configured to generate an enable signal on the basis of a timing control signal, and configured to output the enable signal to the filter control circuit,
    wherein the enable signal outputted from the timing control circuit is inputted into the control signal output circuit and not inputted into the detector and the comparator, and
    the control signal output circuit starts operation or ends operation according to the enable signal.

5. The semiconductor integrated circuit according to claim 1, further comprising:
a timing control circuit configured to generate an enable signal on the basis of a timing control signal, and configured to output the enable signal to the filter control circuit,
wherein the filter control circuit starts operation or ends operation according to the enable signal.

6. The semiconductor integrated circuit according to claim 1, wherein
the determination timing is timing just before the reception.

7. The semiconductor integrated circuit according to claim 1, wherein
the interference wave suppression unit further comprises a switch connected between an output of the amplifier and the output terminal, and the switch is turned off when the filter is turned on and the switch is turned on when the filter is turned off, and
the filter is connected between the output of the amplifier and the output terminal.

8. The semiconductor integrated circuit according to claim 1, wherein
the interference wave suppression unit further comprises a switch, one terminal of the switch is connected to an output of the amplifier and the output terminal, and the switch is turned on when the filter is turned on and the switch is turned off when the filter is turned off, and
the filter is connected between the other terminal of the switch and the ground.

9. The semiconductor integrated circuit according to claim 8, wherein
the filter is a notch filter.

10. The semiconductor integrated circuit according to claim 1, wherein
the coupler is connected to the input terminal and detects the input signal,
the coupler is formed by a capacitor,
one terminal of the capacitor is connected to the input terminal and the input of the amplifier, and
the detection input signal is outputted from the other terminal of the capacitor.

11. The semiconductor integrated circuit according to claim 1, wherein
the coupler is connected to the input terminal and detects the input signal,
the coupler is formed by a transformer,
one terminal of a primary side of the transformer is connected to the input terminal,
the other terminal of the primary side of the transformer is connected to the input of the amplifier,
a bias voltage is supplied to one terminal of a secondary side of the transformer, and
the detection input signal is outputted from the other terminal of the secondary side of the transformer.

12. The semiconductor integrated circuit according to claim 1, wherein
the coupler is connected to the output terminal and detects the output signal, and
the filter control circuit comprises
an attenuator configured to attenuate the detection output signal detected by the coupler to output an attenuated signal,
a detector configured to output a detection voltage according to a signal level of the attenuated signal,
a comparator configured to compare the detection voltage with a reference voltage corresponding to the reference value, and configured to output a comparison result, and
a control signal output circuit configured to output a filter control signal controlling the filter to be on or off, according to the comparison result, at the determination timing.

13. The semiconductor integrated circuit according to claim 12, wherein
an amount of attenuation of the attenuator is set to a level so that the gain of the amplifier is offset.

14. The semiconductor integrated circuit according to claim 1, wherein
the filter does not consume power when the filter is off.

15. The semiconductor integrated circuit according to claim 1, wherein
the filter is a band-pass filter.

16. The semiconductor integrated circuit according to claim 1, wherein
the filter is a band-elimination filter.

17. A semiconductor integrated circuit compliant with a wireless communication standard in which transmission and reception are performed using a time division method, the semiconductor integrated circuit comprising:
an amplifier, an input of the amplifier being connected to an input terminal, a received input signal being inputted into the input terminal, the amplifier outputting an amplified signal;
an interference wave suppression unit comprising a filter being controlled to be on or off, the filter configured to suppress an interference wave component of the amplified signal to output the signal as an output signal to an output terminal when the filter is on, the interference wave suppression unit configured to output the amplified signal as the output signal to the output terminal when the filter is off;
a first coupler configured to detect the input signal;
a second coupler configured to detect the output signal; and
a filter control circuit configured to control the filter to be on when a subtraction signal level obtained by subtracting a signal level of a detection output signal detected by the second coupler from a signal level of a detection input signal detected by the first coupler is greater than or equal to a reference value, and configured to control the filter to be off when the subtraction signal level is smaller than the reference value, at arbitrary determination timing in a period of time between the transmission and the reception, the period of time being an interference wave detection time period.

18. The semiconductor integrated circuit according to claim 17, wherein
the filter control circuit comprises
an input signal detector configured to output an input detection current according to the signal level of the detection input signal from the first coupler,
an output signal detector configured to output an output detection current according to the signal level of the detection output signal from the second coupler,
a subtractor configured to subtract the output detection current from the input detection current and configured to output a subtraction result as a subtraction current,
a current-voltage conversion circuit configured to convert the subtraction current into a detection voltage,
a comparator configured to compare the detection voltage with a reference voltage corresponding to the reference value, and configured to output a comparison result, and a control signal output circuit configured to output a filter control signal controlling the filter to be on or off, according to the comparison result, at the determination timing.

19. The semiconductor integrated circuit according to claim 18, further comprising:
a timing control circuit configured to generate an enable signal on the basis of a timing control signal, and configured to output the enable signal to the filter control circuit,
wherein the filter control circuit starts operation or ends operation according to the enable signal, and
the control signal output circuit controls the filter to be on when the control signal output circuit starts operation.

20. The semiconductor integrated circuit according to claim 17, wherein
the interference wave suppression unit further comprises a switch connected between an output of the amplifier and the output terminal, and the switch is turned off when the filter is turned on and the switch is turned on when the filter is turned off, and
the filter is connected between the output of the amplifier and the output terminal.

* * * * *